United States Patent Office 3,576,607
Patented Apr. 27, 1971

3,576,607
PROCESS FOR THE RECOVERY OF AMMONIUM SALTS FROM PROCESS WASTE STREAMS
Andrew T. Guttmann, Maple Heights, Michael G. Konicek, Mayfield Heights, and Albert J. Grigsby, Northfield, Ohio, assignors to The Standard Oil Company, Cleveland, Ohio
No Drawing. Filed Apr. 11, 1968, Ser. No. 720,447
Int. Cl. B01d 9/02; C01b 21/00
U.S. Cl. 23—299                                6 Claims

ABSTRACT OF THE DISCLOSURE

A process is described for the recovery of fertilizer grade ammonium salts in high yields from acrylonitrile waste water process streams containing water-soluble organic tars by the removal of water and volatile organic matter from the waste water process streams in the presence of a water miscible solvent, recovering the solid ammonium salt from the residual ammonium salt-solvent-tar mixture and recovering the solvent for re-use.

---

The present invention relates to the recovery of ammonium salts from waste water process streams resulting from the manufacture of alpha-beta-monoolefinically unsaturated nitriles. More particularly, the present invention relates to a process for recovering ammonium salts from the bottoms of a waste water distillation column used in plants for the manufacture of acrylonitrile and methacrylonitrile.

Processes and catalysts for the manufacture of acrylonitrile and methacrylonitrile by the ammoxidation of propylene and isobutylene, respectively, are well known and have been described, for instance, in U.S. Pat. Nos. 3,152,170; 3,153,085; 3,197,419; 3,198,750; 3,200,081; 3,200,084; 3,200,141; and British Pat. No. 987,960. In most of these processes a slight excess of ammonia is used in the reactor feed. As a result, ammonia often appears in the reactor effluent and is usually absorbed by a dilute acid thus forming a waste solution of ammonium salts.

The advantages derived from the recovery of ammonium salts from these waste streams are twofold. The ammonium salt solution is no longer a disposal problem and at the same time is a potential source of fertilizer grade ammonium salts. The economics of recovering the salts and successfully disposing of the remaining waste water are closely linked to the profitable operation of the acrylonitrile or methacrylonitrile plants.

The present invention is concerned with the recovery of ammonium salts formed in the quenching step of the acrylonitrile manufacturing process from water soluble heavy organic by-products, or the so-called "tars" in the quench solution.

More specifically, this invention relates to the separation of saleable ammonium salts substantially free of carbonaceous materials from organic "tars" by the removal of water and volatile organic matter from waste water column bottoms in the presence of a water-miscible solvent such as a polyhydric alcohol, or the ether or the ester of a polyhydric alcohol, followed by the separation of the slightly soluble solid ammonium salt from the solvent-"tars" solution. This invention also contemplates the recovery of the solvent from the "tars" for re-use in the process.

In a more preferred embodiment of this invention ammonium salts are separated from water and organic "tars" in waste water column bottoms by removing volatile organic matter and at least 90 percent of the water originally present by distillation in the presence of a water-miscible polyhydric alcohol, an ether or an ester of a polyhydric alcohol, followed by the separation of the solid ammonium salt from the solvent-"tar" solution and if desired the recovery of the solvent from solution by distillation. The solvent can be added in amounts ranging from about 5 percent to about 50 percent by weight and preferably in amounts of about 10 percent to 25 percent by weight based on the original weight of the waste water stream.

One of the primary advantages of the process of this invention is the elimination of the problems caused by "tar" deposition and fouling of equipment normally encountered in similar recovery operations. Greater insight as to the problems involved in such recovery operations can be gained from the following general description of the process for manufacturing acrylonitrile or with certain modifications, from the manufacture of methacrylonitrile.

In U.S. Pat. No. 2,904,580, filed Sept. 20, 1957, a process is described for the manufacture of acrylonitrile which comprises the gaseous phase catalytic reaction of propylene, ammonia and a molecular oxygen-containing gas. In this vapor phase catalytic reaction, preferably carried out in a fluidized bed-type reactor, a part of the ammonia which is introduced as feed to the reactor is unreacted and consequently is carried over in the effluent gases from the reactor along with acrylonitrile, usually along with some unreacted feed materials such as propylene, oxygen and nitrogen. The reactor effluent usually contains other reaction products such as hydrogen cyanide, acetonitrile, etc. Ammonia, however, catalyzes the polymerization of the monomeric reaction products such as acrylonitrile and hydrogen cyanide, and the cyanoethylation of hydrogen cyanide to form succinonitrile. In addition, ammonia can be cyanoethylated by acrylonitrile to form $\beta$-aminopropionitrile, $\beta,\beta'$-iminodipropionitrile, and $\beta, \beta', \beta''$-nitrilotripropionitrile. Formation of these compounds can significantly lower the yield of recovered acrylonitrile and hydrogen cyanide and can cause operational problems. Consequently, the vapors of the reactor effluent are contacted with an aqueous solution of a dilute mineral acid to neutralize the ammonia while cooling the effluent for product recovery. This operation is accomplished in the quench tower and has the consequence of forming substantial amounts of by-product ammonium salt in the quench tower bottoms. In a subsequent step, the bottoms from the quench tower is fractionated in a waste water column.

Any mineral acid may be used in the neutralization step, but it is preferred to use an acid the ammonium salt of which has good fertilizer value or a ready market. Such preferred acids are phosphoric, nitric, sulfuric and hydrochloric acids. Despite the absorption of the ammonia by the dilute acid. some cyanoethylation of the ammonia does take place, as not all the excess ammonia in the reactor effluent gases can be removed quickly enough. As a result, these cyanoethylated products react with other constituents of the reactor effluent stream and form polymers. Some of these polymers are high molecular weight and most of them are characteristically water soluble, with the result that the aqueous stream issuing from the bottom of the quench tower not only contains ammonium salts of the mineral acid used, some acrylonitrile and other products of reaction, but is contaminated with organic "tars" in solution. Some of these "tars" comprise partially hydrolyzed polyacrylonitrile, polyacrylamide, polymers of unsaturated aldehydes and unsaturated ketones, cyanhydrins and various cyanoethylated by-products. Characterization of a typical waste water column residue is summarized in Table I. The compounds present were identified by gas chromatography and mass spectroscopy.

TABLE I

Characterization of waste water column bottoms 9.57 wt. percent solids (slow evaporation to dryness, 6 hours at 120° C.)
0.48 wt. percent cyanide
1.65 wt. percent $NH_3$ by titration
pH of 4.9–5.0
1.47% sulfur
Chemical oxygen demand: 45,404, 46,754, 44,022 p.p.m.
Total nitrogen of 2.17%
Nitrogen types:
    0.0061% nitrate
    0.054% nitrate
    0.31% amide
    1.37% $NH_3$
    0.42% nitrile (by difference)
    0.1% acetaldehyde
    0.02% acrolein
    0.4% HCN
    0.2% acetic acid
    0.05% fumaronitrile
    0.03% acrylic acid
    0.1% acrylamide
Color similar to strong tea or coffee.
Usually contains some catalyst fines.

Efforts to recover the valuable ammonium salts by removing water from this waste water stream have heretofore been unsuccessful mainly because organic "tars" precipitate from solution and plug the equipment long before the solution is concentrated sufficiently to precipitate the salt therefrom. In addition, the "tars" are heat sensitive and local overheating decreases their solubility in water and in other solvents, if a solvent is employed for purposes of extraction. This type of recovery operation produces a brown, lumpy solid material which when ground to a dry powder results in a very impure product of improper particle size.

We have discovered a highly efficient process for the recovery of ammonium salts from the bottoms of a waste water column in which the operational problems resulting from the deposition of "tars" are virtually eliminated. Recovery of ammonium salts of high purity can be accomplished by the evaporation of the water and volatile organic matter from the feed in the presence of a solvent in such a manner that most of the water and volatile organic material are removed by distillation, while a slurry of essentially pure ammonium salt in a solution of the "tars" in the solvent remains as residue. The ammonium salt is separated by centrifugation, sedimentation, or preferably filtration, and the solvent may be recovered for re-use by distillation under reduced pressures. The ammonium salt is recovered as a light cream-colored, free-flowing crystalline material having the appearance of granulated sugar. This process may be practiced continuously, intermittently, or batch-wise.

In the process of this invention, water, which is a common solvent for both the undesirable "tar" and the valuable ammonium salt, is evaporated and simultaneously replaced by a solvent that will solubilize the "tar" but not the salt, thus making recovery of the salt possible. The solvent employed must be higher boiling than water and must be completely miscible with water so as to solubilize the "tars." Solvents that are suitable for this process are the polyhydric alcohols, their ethers and their esters. For convenience in handling and recovery by distillation, the polyhydric alcohols, their ethers or esters should be liquid at room temperature, with boiling points not exceeding 230–270° C., and preferably not exceeding 250° C. Generally, simple aliphatic diols having up to six carbon atoms, diglycol ethers, triglycol ethers, glycerol, their ethers or esters with a total of six to eight carbon atoms are suitable. For instance, ethylene glycol, di- and triethylene glycol, propylene glycol, dipropylene glycol, monoacetates, monomethyl-, ethyl-, propyl-, and butyl ethers of the above glycols, butane-, pentane-, and hexanediols, glycerol, glycerol mono- and dimethyl ethers, and glycerol mono- and diacetates may be used. Particularly suitable and preferred solvents for this process are ethylene glycol and the propylene glycols.

The solvent may be added to the bottoms of the waste water column at any stage of the waste water evaporation operation but prior to the substantial precipitation of the salt or "tars."

The distillation of the waste water column bottoms may be carried out at atmospheric or reduced pressures. It may be advantageous to employ fractional distillation in the water removal so as to reduce the loss of solvent to the distillate. It is also advantageous to remove as much of the water as possible from the waste water column bottoms before the filtration of the residual slurry. The higher the water content of the filtrate, the greater the loss of the ammonium salt through solution and the more uneconomical the operation will be due to low yields of ammonium salt. Furthermore, recovery of the solvent by distillation at relatively high temperatures from a solution containing substantial amounts of ammonium salt will result in partial decomposition of the latter, and in the case of ammonium sulfate, leads to the evolution of ammonia and sulfur oxides. For most efficient recovery, at least 90 percent and preferably 95–99 percent of the water originally present in the waste water column bottoms should be removed by distillation before the residual slurry is filtered.

The salt obtained after filtration, though free from any "tar" particles, contains some solvent and water of the filtrate composition. The purity of the salt can be substantially improved by washing with fresh solvent followed by removal of the adhering solvent by subsequent washing with the waste water column bottom feed. The solvent in the filtrate can be recovered almost quantitatively by distillation of the solvent-"tar" mixture under reduced pressures.

By means of this process, ammonium salts with a purity in the range of 98 percent can be recovered from these waste water streams in yields as high as 95 percent.

The efficiency of the process of this invention can be illustrated by the experiments summarized in Tables III and IV. The general procedure employed consisted of mixing a sample of the bottom stream from the waste water column of the composition shown in Table II, with 10–20 percent by weight of a polyhydric alcohol; removing 90–99 percent of the water by distillation followed by filtration of the residue to remove the solid ammonium salt.

TABLE II

Analysis of waste water column bottoms streams

| | |
|---|---|
| Total solids (percent) | 13.0 |
| $(NH_4)_2SO_4$ (percent) | 12.4 |
| HCN (p.p.m.) | 1230 |
| Carbon (p.p.m.) | 12,000 |
| Organic matter (percent) | 2.2 |
| pH | 5.4 |

The small-scale experiments were carried out in a one-liter resin flask equipped with an agitator, thermometer, addition funnel and a condenser assembled for distillation.

The larger scale experiments were carried out in a one-gallon glass-lined reactor with an agitator, heated by a circulating oil bath, equipped with temperature controls, charging ports and a bottom valve. The reactor had a five-tray Oldershaw column for distillate take-off in which a reflux ratio of 1:1 was maintained. With one exception, distillations in all cases were carried out at atmospheric pressure.

In both series of experiments, alcohol and ammonia balances were determined by analysis of the distillate, the wet filter cake and the filtrate from the distillation residue.

The glycol analyses reported in Tables III and IV were done by infrared analyses and gas chromatography using a Porapak Q column. The ammonium salt was determined by the standard Kjeldahl procedure, and water determinations were made by Karl Fischer titration.

More details of the process of this invention will be apparent from the examples given below where the salt recovered is ammonium sulfate and the solvent employed is ethylene glycol.

TABLE III

| | Water in distillate | Ethylene glycol in— | | | | $(NH_4)_2SO_4$ in— | | |
|---|---|---|---|---|---|---|---|---|
| | | Distillate | Filter cake | Filtrate | Total balance | Filter cake | Filtrate | Total balance |
| Example: | | | | | | | | |
| 1 | 97 | | | | | 94 | 6 | 100 |
| 2 | 95 | | | | | 81 | 12 | 93 |
| 3 | 99 | 7 | 3 | 82 | 92 | 89 | 5 | 94 |
| 4 | 99 | 12 | 19 | 54 | 85 | 93 | 2 | 95 |
| 5 | 95 | 0.3 | 5 | 98 | 103 | 82 | 13 | 95 |
| 6 | 90 | 0 | 7 | 99 | 100 | 63 | 24 | 87 |

TABLE IV

| | Example | | | |
|---|---|---|---|---|
| | 3 | 4 | 5 | 6 |
| Percent $H_2O$ removed | 99 | 99 | 95 | 90 |
| Filtrate composition, percent: | | | | |
| $H_2O$ | 6.4 | 4.3 | 25.8 | 33.0 |
| Glycol | 82.6 | 73.0 | 70.5 | 56.9 |
| $(NH_4)_2SO_4$ | 5.4 | 5.1 | 9.8 | 13.1 |
| Wet filter cake composition, percent: | | | | |
| $(NH_4)_2SO_4$ | 89.0 | 82.0 | 88.2 | 69.2 |
| $H_2O$ | 8.2 | 4.3 | 6.8 | 22.8 |
| Glycol | 2.8 | 13.7 | 5.0 | 8.0 |

EXAMPLE 1

(A) Using the one-liter resin flask assembly described above, 600 grams of waste water from the acrylonitrile plant of the composition shown in Table II, containing 81 grams of dissolved ammonium sulfate, and 6 to 8 grams of "tar," were mixed with 90 grams of ethylene glycol. The solvent-waste water mixture was distilled until 540 grams of distillate, containing 97 percent of the water originally present, were removed.

(B) The residue consisted of a crystalline slurry which on filtration yielded 90 grams of a yellow solid and 60 grams of a dark liquid. The crude solid consisted of 85 percent ammonium sulfate mixed with water and glycol-tar solution. After washing the solid with fresh ethylene glycol and a small amount of undistilled waste water to remove the glycol adhering to the salt, and drying 94 percent by weight of the ammonium sulfate originally present in the starting solution was recovered as a white solid. The liquid filtrate contained 6 percent dissolve ammonium sulfate, and additional water, dissolved "tars" and ethylene glycol.

EXAMPLE 2

The procedure of Example 1 was employed using weight ratio of ethylene glycol to waste water column bottoms of 0.20 and removing 95 percent of the water originally present in the waste water column bottoms as distillate in step A. The percent of ammonium sulfate recovered is given in Table III.

EXAMPLE 3

The procedure of Example 1 was followed using an ethylene glycol/waste water column bottoms weight ratio of 0.11 and removing 99 percent of the water originally present as distillate in step A. The percents of ethylene glycol found in the distillate and the percent of ammonium sulfate and ethylene glycol found in the filter cake and filtrate are shown in Tables III and IV.

EXAMPLE 4

The procedure of Example 3 was used with the exception that the volatiles in step A were removed by distillation under reduced pressure, at ~350 mm. Hg. The results are shown in Tables III and IV.

EXAMPLE 5

Using the one-gallon glass-lined reactor assembly with the Oldershaw column described above, 4000 grams of waste water column bottoms of the composition shown in Table II were mixed with 480 grams of ethylene glycol. The solvent-waste water mixture was distilled at atmospheric pressure, maintaining a reflux ratio of 1:1 in the fractionating column, until 3312 grams of distillate were removed containing about 95 percent of the water originally present. The distillate was found to contain only about 0.05 percent glycol, corresponding to 0.3 percent of the original glycol charge.

The distillation residue was drained from the reaction vessel and filtered. 480 grams of a yellow solid and 670 grams of a dark-colored liquid filtrate were obtained. The material balances and the analysis of the crude solid and the filtrate are shown in Tables III and IV.

EXAMPLE 6

The procedure of Example 5 was followed employing a weight ratio of ethylene glycol to waste water column bottoms of 0.13 and removing 90 percent of the water originally present as distillate. The percents of ethylene glycol found in the distillate and the percent of ammonium sulfate and ethylene glycol found in the filter cake and filtrate are given in Tables III and IV.

EXAMPLE 7

105 grams of a filtrate described in Example 3 containing 82.6 percent ethylene glycol, 6.4 percent water, 5.4 percent ammonium sulfate and 5.6 percent "tar" were mixed with 20 grams of high boiling mineral oil. The oil was added to improve heat transfer and agitation should the mixture tend to solidify during distillation. The mixture was vacuum distilled at a temperature of 116–120° C. (pot temperature) and very briefly at 150° C. under 30 mm. Hg pressure. 87 grams of distillate and 39 grams of residue consisting of 19 grams of "tar" and 20 grams of mineral oil were recovered. The mineral oil was immiscible with the residue and was recovered quantitatively. The distillate contained 81 grams of ethylene glycol, equivalent to 95 percent of that in the starting mixture.

By comparing the distribution of ammonium sulfate and ethylene glycol in the distillate, filter cake, and filtrate of Examples 1 through 6 in Tables III and IV, the data show that the recovery of ammonium sulfate in the wet filter cake is dependent upon the amount of water removed in the distillation. Removal of 97–99 percent of the water originally present results in the recovery of 93–94 percent of the ammonium sulfate, while on removing 90 percent of the water present only 63 percent of the salt is recovered in the filter cake. The remainder of the salt is solubilized in the filtrate which contains glycol, water and dissolved "tars." The composition of the filtrates of Examples 3 to 6 given in Table IV shows that the higher the water content of the filtrate, the higher the amount of ammonium sulfate dissolved therein.

The data in Table III also show that the loss of glycol to the distillate can be kept below 0.3 percent with the use of a fractionating column as in Examples 5 and 6. Without fractionation at least 7 percent of the glycol charged can be carried over with the distillate.

We claim:
1. A process for the separation of ammonium sulfate from an aqueous solution recovered from a waste water stream produced in acrylonitrile and methacrylonitrile manufacturing processes containing ammonium sulfate, volatile organic matter and water-soluble organic tars comprising:
   (a) adding from 5 to 50 percent by weight of the weight of the solution selected from the group consisting of glycols containing up to six carbon atoms, diglycol ethers, triglycol ethers, glycerol, ethers and esters of said glycols containing up to a total of eight carbon atoms to the solution,
   (b) removing some water and the volatile organic matter from the solution by distillation, and
   (c) separating precipitated ammonium sulfate from the residual ammonium sulfate-solvent-tar mixture.
2. The process of claim 1 wherein the precipitated ammonium sulfate is separated from the residual solvent-tar solution by filtration.
3. The process of claim 2 wherein the solvent is recovered from the residual solvent-tar mixture after (c) by distillation.
4. The process of claim 3 wherein at least 90 percent by weight of the water and volatile organic matter are removed by distillation.
5. The process of claim 1 wherein the solvent is ethylene glycol.
6. The process of claim 1 wherein the solvent is a propylene glycol.

References Cited

UNITED STATES PATENTS

| | | | |
|---|---|---|---|
| 2,648,594 | 8/1953 | Olson | 23—120X |
| 2,659,659 | 11/1953 | Shmidl | 23—302X |
| 3,180,713 | 4/1965 | Flay | 23—119X |
| 3,328,266 | 6/1967 | Modiano | 260—465.9X |
| 3,366,681 | 1/1968 | Thoma | 23—119X |
| 3,408,157 | 10/1968 | Miller | 23—302X |
| 3,468,624 | 8/1969 | Miller | 23—302X |

FOREIGN PATENTS

| | | | |
|---|---|---|---|
| 328,635 | 8/1935 | Italy | 23—302 |
| 566,246 | 11/1958 | Canada | 23—119 |

WILBUR L. BASCOMB, JR., Primary Examiner

S. J. EMERY, Assistant Examiner

U.S. Cl. X.R.

23—300, 302, 119, 120; 260—465.9

PO-1050
(5/69)

UNITED STATES PATENT OFFICE
CERTIFICATE OF CORRECTION

Patent No. 3,576,607      Dated April 27, 1971

Inventor(s) Andrew T. Guttmann, Michael G. Konicek, and Albert J. Grigsby

It is certified that error appears in the above-identified patent and that said Letters Patent are hereby corrected as shown below:

In the Specification:

Column 1, line 65, "solvent-"tars" should be --solvent-"tar"--

Column 2, line 54, after "acid" replace the period with a comma

Column 3, line 14, "0.054% nitrate" should be --0.054% nitrite--

Column 5, line 34, "$(NH_4)SO_4$" should be --$(NH_4)_2SO_4$--

In the Claims:

Column 7, line 19, after "solution" insert --of a solvent--.

Signed and sealed this 24th day of August 1971.

(SEAL)
Attest:

EDWARD M. FLETCHER, JR.      WILLIAM E. SCHUYLER, JR.
Attesting Officer      Commissioner of Patents

UNITED STATES PATENT OFFICE
CERTIFICATE OF CORRECTION

Patent No. 3,576,607          Dated April 27, 1971

Inventor(s)   Andrew T. Guttmann et al.

It is certified that error appears in the above-identified patent and that said Letters Patent are hereby corrected as shown below:

Column 7, line 22, after "glycols" insert -- and glycerol --.

Signed and sealed this 7th day of March 1972.

(SEAL)
Attest:

EDWARD M. FLETCHER, JR.                    ROBERT GOTTSCHALK
Attesting Officer                          Commissioner of Patents